United States Patent [19]

Kuperman

[11] Patent Number: 4,658,246
[45] Date of Patent: Apr. 14, 1987

[54] MATRIX DISPLAY SIMULATION

[75] Inventor: Gilbert G. Kuperman, Dayton, Ohio

[73] Assignee: The United States of America as represented by the Secretary of the Air Force, Washington, D.C.

[21] Appl. No.: 640,624

[22] Filed: Aug. 14, 1984

[51] Int. Cl.$^4$ .............................................. G09G 1/16
[52] U.S. Cl. ................................... 340/723; 340/752; 340/793; 434/43; 358/22
[58] Field of Search ............... 340/723, 728, 703, 793, 340/734, 752; 358/22, 81, 283, 298; 434/43

[56] References Cited

U.S. PATENT DOCUMENTS

| | | | |
|---|---|---|---|
| 3,922,484 | 11/1935 | Keller | 358/81 |
| 4,151,549 | 4/1979 | Bautze | 358/89 |
| 4,223,353 | 9/1980 | Keller et al. | 358/230 |
| 4,242,678 | 12/1980 | Somerville | 340/728 |
| 4,258,393 | 3/1981 | Ejiri et al. | 358/283 |
| 4,295,135 | 10/1981 | Sukonick | 340/734 |
| 4,405,920 | 9/1983 | Weisstein | 340/723 |
| 4,558,359 | 12/1985 | Kuperman et al. | 358/89 |

Primary Examiner—Gerald L. Brigance
Attorney, Agent, or Firm—Gerald B. Hollins; Donald J. Singer

[57] ABSTRACT

A system for simulating the display of visual images by a matrix of liquid crystal cells or other matrix elements and providing flexibility in selecting display characteristics such as element size, active area ratio, and signal noise content. The display preferably employs a cathode ray tube and uses software signal processing.

14 Claims, 10 Drawing Figures

MATRIX DISPLAY SIMULATION

RIGHTS OF THE GOVERNMENT

The invention described herein may be manufactured and used by or for the Government of the United States for all governmental purposes without the payment of any royalty.

BACKGROUND OF THE INVENTION

This invention relates to the art of high resolution video displays such as scanning cathode ray tube display and to the use of such displays for simulating other lower resolution display forms for evaluation purposes.

It is common present-day practice to employ the cathode ray tube as an indicating display in the cockpit of an aircraft—for flight systems monitoring, weapon systems operation, navigation displays and for the presentation of external information obtained from, for example, a radar set or infrared camera. Although the art of aircraft cockpit displays has progressed significantly in response to the availability of denser and more capable electronic systems, the physical size, weight, fragility, voltage requirements, limited light output and other characteristics of the cathode ray tube have been restricting factors in the further improvement of such cockpit displays.

The evolution of matrix display devices such as the liquid crystal cell, the light emitting diode matrix, and even the incandescent lamp matrix (as is commonly employed in sports stadium scoreboards) has suggested such technologies as a possible replacement for the cathode ray tube in aircraft and other military electronic systems.

Some properties of these modern-day display devices are of course advantageous in aircraft and military systems use, notable among these properties are the small size, light weight, low operating voltage, immunity to large ambient light levels (at least for the reflective image types), long operating life and low power consumption. Most notable among the disadvantages of these modern-day display devices in their matrix or field of discrete elements nature. According to this nature, each information-bearing element is separated from adjacent information-bearing elements by an inactive display region which can occupy a significant portion of the total display area. In such displays the ratio of useful display area to total display area is often described in terms of an evaluating factor called the active area ratio for the display.

Other properties which require consideration in the application of a matrix display to a particular system include the density of the required display elements to adequately convey the anticipated information, the total number of display elements or image size required, the available dynamic signal range in the display elements and the response of the display elements to noise and other random signal modulation effects.

The liquid crystal cell in which an electric field causes the liquid crystal material to change from a transparent to a diffusing nature is one of the more promising matrix display devices for use in aircraft and other military systems. The liquid crystal cell, of course, does not generate light, but rather modifies the reflectance or transmission of incident light in response to an applied electric field. Properties and characteristics of liquid crystal displays are discussed in the published article "Liquid Crystal Matrix Displays", by B. J. Lechner, F. J. Marlow, E. E. O. Nester, and J. Tults published in the Proceedings of the IEEE Vol. 59, No. 11, November 1971, and also in the article "The Relative Merits of LED's and LCD's" written by L. A. Goodman, Proceedings of the SID, Vol. 16, No. 1, First Quarter, 1975. The contents of these two articles are hereby incorporated by reference into the present specification.

Before a liquid crystal display or other matrix display arrangement can be satisfactorily employed in either a replacement or new equipment environment where a high-resolution display such as a cathode ray tube might otherwise be used, careful consideration of human communicating characteristics is needed. An effective way for accomplishing these considerations is of course the fabrication of a sample display which is similar to the type contemplated for the equipment. Prior to the expense and time of constructing a working display, however, and while such a project is in the conceptual stages, it is frequently desirable to employ simulations of the contemplated display in order that the tradeoffs involved in an actual equipment design be evaluated quickly and at minimum cost. Such a simulation thereby allows the critical display parameters to be narrowed to a limited range of variation for making a final selection using actual working displays.

Heretofore, simulations of a matrix display have been achieved with photographic techniques including hand-laid opaque tape grid masks used in conjunction with actual photograph images for approximately evaluating the final display appearance. Clearly, such techniques involving tedious hand fabrication steps are both expensive and lacking in accuracy and flexibility. Simulations of this type are additionally somewhat optimistic in their presentation since the underlying photograph can include gray level information which may not be available or may be modified in density by the contemplated matrix display elements. The availability of computer and image processing techniques offers a convenient improvement over these prior art simulation techniques and allows the desired simulation to be accomplished using flexible and readily-available cathode ray tube monitors.

The U.S. Patent art includes numerous examples of electronically-controlled display apparatus, including cathode ray tube displays used for conveying electronically generated images to a human observer and employing electronic processing of the image information to achieve a variety of display modifications. An example of electronic processing used to control a display image includes the patent of Daniel W. Somerville, U.S. Pat. No. 4,242,678, which concerns a character generator that provides characters of variable size by electronically magnifying a basic character image and employing shape codes at each point of the basic character for expanding the point information.

The Somerville patent is, however, concerned with generating pleasing character shapes in a variety of sizes and height to width aspect ratios, rather than the processing of image information to achieve a simulated matrix display.

Another example of the prior patent art in the image display area is the patent of John T. Keller et al. U.S. Pat. No. 4,223,353, which addresses the question of display persistence desirable in a medical diagnostic apparatus employed in nuclear medicine testing procedures. The Keller apparatus provides electronically-generated display persistence using digital circuitry and is capable of numerous shades of display gray level. The Keller apparatus is an improvement on a prior art persistence apparatus which employed the decay of a cathode ray tube phosphor as the persistence generating mechanism. In addition to the increased number of gray levels, the Keller apparatus accommodates a large dynamic range of signals by way of a logarithmic conversion and notably allows operator control of the image persistence. In the Keller apparatus, persistence is determined by the amplitude of digital signals stored in a memory with the stored information being modified in accordance with an operator-elected persistence. The Keller invention does not teach the electronic variation of image parameters relevant to the simulation of a matrix display, however.

Two of my own prior patents, U.S. Pat. No. 4,510,525, concerning an Anaglyphic Stereoscopic Image Apparatus and Method, and U.S. Pat. No. 4,591,998 concerning a Dynamic Bar Pattern Apparatus and Method, also teach the use of electronic processing to modify information subsequently displayed on a cathode ray tube device. These two patents moreover employ computer-oriented processing involving some of the same processing hardware as employed in a preferred embodiment of tne present invention. The purpose and nature of the processing employed in these two prior patents is, however, significantly different from that of the present invention. In the first of my prior patents, a three-color display is employed for conveying a stereoscopic image relating to the density of an original image, while in the second of my prior patents the subject is the generation of a moving grid of bar patterns as might be employed in psychological testing and training. The disclosure of my two prior patents is however hereby incorporated by reference into the present specification.

SUMMARY OF THE INVENTION

An object of the present invention is to provide a flexible simulation of a matrix display employing readily-available standard computer apparatus.

Another object of the invention is to provide a matrix display simulation wherein a plurality of the display characteristics are subject to convenient operator manipulation.

Another object of the invention is to provide a matrix display simulation that is usable to simulate a variety of matrix element types.

Yet another object of the invention is to provide a matrix display simulator capable of operating with a variety of input signal sources.

Yet another object of the invention is to provide a matrix display simulation which is stable and repeatable in characteristics.

Yet another object of the invention is to provide a matrix display simulation which provides for coding an input image into a first array of digital signals representing image density, means for equalizing the digital signal magnitudes for closely adjacent pixels in the input image to a common density value, together with means for scaling the range of density values in the image and means for modulating the density values with a pseudo-noise modulation component, together with a cathode ray tube display for reconstructing and displaying the processed image and a grid writing means for obscuring portions of the displayed image along a grid of periodically spaced orthogonal bands that are controllable as to spacing and width and pixel density.

DETAILED DESCRIPTION

Figure 1:
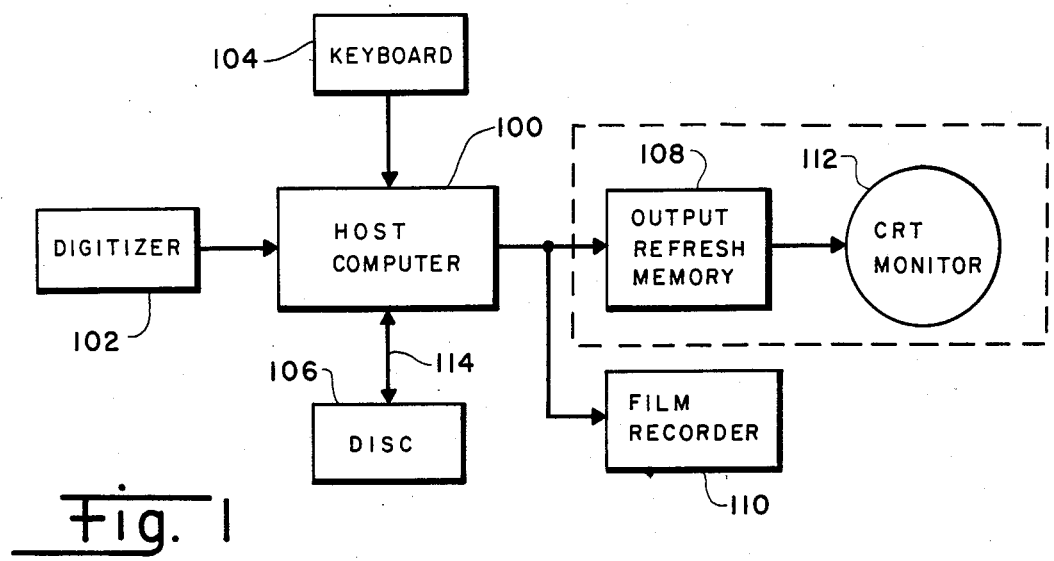
FIG. 1 is a block diagram of a computer-based apparatus used in embodying the invention.

FIG. 1 of the drawings shows a block diagram of a computer-based system that is capable of processing the image obtained from a photograph or a live scene video source in order that the processed image provide the appearance of a matrix display having a variety of matrix characteristics or matrix parameters. The FIG. 1 system includes a host computer 100, which receives digitized image information from an analog-to-digital digitizing video source 102, operator command information from a keyboard 104, and stored information from a memory, preferably a magnetic disk storage unit 106. Information transfer between the host computer 100 and the magnetic disk 106 is bi-directional in nature, as indicated by the two-direction path 114, the disk serves to store both image information and computer overhead flies as is commonly arranged in the computer art. The output of the host computer 100 is supplied to a cathode ray tube monitor 112 by way of an output refresh memory unit 108. The output of the host computer 100 can also be supplied to a film recorder 110 which may be of the cathode ray tube type.

The host computer 100 is perferably of the PDP 11 or VAX type manufactured by Digital Equipment Corporation of Boston, MA; the computer being arranged to accept FORTRAN language programming and is presumed to be programmed with an operating system as is described below. The cathode ray tube monitor 112 may be of the black and white raster scan type that is capable of resolving 512 or more pixels in the horizontal and vertical directions. A multi-color cathode ray tube (CRT) could of course be employed at 112 and used in the monochrome operating mode or, with suitable alteration of the apparatus and software herein described, used in a multi-color operating mode. A more complete description of the FIG. 1 apparatus is contained in my two above-identified patent applications which have been incorporated by reference into the present specification. These two prior patent applications also incorporate the following published material which is descriptive of the International Imaging System ($I^2S$) model 70E image processor used to embody the portion of the FIG. 1 apparatus indicated by the block 109 in the preferred embodiment of the invention.

"Applications of Digital Image Processing Techniques and Hardware to Regional Growth Modeling" by Ted Driscoll, Proceedings of the American Society of Photogrammetry, Vol. 1, 45th Annual Meeting, Mar. 18–24 1979, Washington, D.C. The bibliography and Technical appendix of this article covering the Model 70 processor are of additional interest.

"A Low Cost Transportable Image Processing System" by John R. Adams and Edward C. Driscoll, First ASSP Workshop on Two-Dimensional Digital Signal Processing, Oct. 3-4, 1979, Lawrence Hall of Science, Berkeley, CA.

"High Speed, Hardware Classification of Multispectral Imagery duplicated in a General Purpose Image Display" by Edward C. Driscoll, Jr. of I2S, *Journal of Applied Photographic Engineering*, June 1982, Vol. 8, No. 3.

"Evolution of Image Processing Algorithms from Software to Hardware" by Ted Driscoll and Chris Walker of I2S. Proceedings of Society of Photooptical Instrumentation Engineers, Vol. 271, February 1981, Paper #17.

"New Concepts in Display Technology" by John Adams and Robert Wallis, *Computer Magazine*, August 1977, p. 61–69.

Generally, the FIG. 1 system operates to receive and store scanned high-resolution image pixel signals from the digitizer 102, combine these high-resolution pixels into lower resolution pixels as selected by keyboard command, and to display these lower resolution pixels in combination with selectable noise and a selectable matrix grid of interstitial bar patterns which separate adjacent display elements. The FIG. 1 systems may also include the capability of changing the size of the displayed image in either the smaller or larger directions by way of electronic adjustments to the image information. The manner of accomplishing these operations is described in greater detail below. The need for a system of the type shown in FIG. 1 is illustrated by the report "Element Density and Percent Active Area Design Requirements for Liquid Crystal Displays", prepared by the 6750th Aerospace Medical Research Laboratory at Wright-Patterson AFB, Ohio 45433 and Systems Reserach Laboratories, Inc., 2800 Indian Ripple Road, Dayton OH 45440, in connection with Air Force Contract Number F33615-74-C-1219; copies of this report are available from the National Technical Information Service (NTIS); the report is herein referred to as "the SRL report". The study reported in the SRL report used the technique of opaque tape laid on a transparent carrier overlaying a conventional photograph of transparency to simulate a matrix display. Clearly a system made in accordance with FIG. 1 offers significant advantages in flexibility, speed and cost in performing display evaluations and establishing system design criteria over such an overlay arrangement. Notwithstanding these limitations, the SRL report contains informative background material which is useful in understanding the present invention. The contents of the SRL report are hereby incorporated by reference into the present specification.

In FIG. 2 of the drawings, a simulated image example of processing and display in accordance with the present invention is shown. In the FIG. 2A portion of FIG. 2 there is shown an annular ellipse 200 such as might, for example, comprise the outline of a swimming pool in a low-level aerial photograph or alternately might comprise the running path of a race track in a higher elevation aerial photograph—and therefore might comprise an image to be presented on the cockpit display of an aircraft. Alternately, the ellipse 200 might comprise the return from an infrared scanning apparatus or a radar apparatus or might comprise a symbol such as the outline of a fuel tank or a warning alert symbol used to indicate an out-of-tolerance avionics system parameter (such as excessive engine temperature).

Figure 2A:
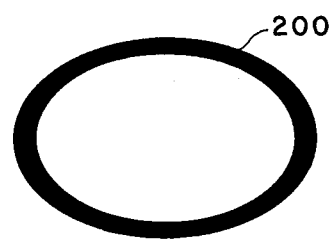
FIG. 2 including the views 2A through 2D show an enlarged simulated image displayed according to three matrix display parameter variations.

Regardless of the source of the ellipse 200, the view of FIG. 2A may be considered an ultimate resolution display of the ellipse image a display typical of the capability of a high-resolution CRT apparatus. The degree to which a matrix display of, for example LCD elements, approaches the FIG. 2A view, is of course dependent upon the resolution active area and other parameters elected for the matrix display.

Figure 2C:
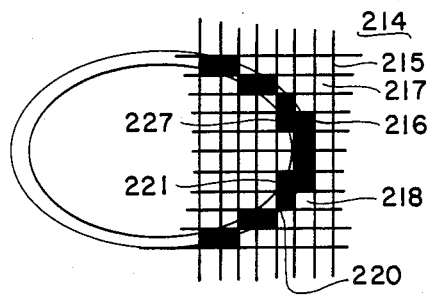
Figure 2B:
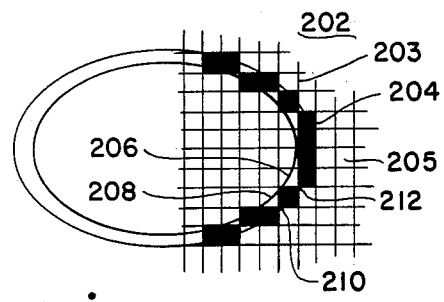

In FIG. 2B, for example, is shown a representation of the annular ellipse 200 which might exist with a matrix display having both horizontal and vertical resolution which divide the ellipse into a sixteen by sixteen matrix of resolution cells—as is indicated at 205. The grid lines 203 in FIG. 2B are shown to occupy a small percentage, less than 10%, of the total image area and the resolution cells are relatively small with respect to the image structure so that the matrix reproduction 202 is of reasonably high quality.

Despite this generally high quality of the FIG. 2A reproduction, expected deviations between the original image and the reproduction 202 may be observed to occur in the regions of high ellipse curvature as is indicated at 206, 208, 210 and 212 in FIG. 2B; the end portion of the ellipse reproduction 202 in FIG. 2B assumes the form of four vertically aligned resolution cells as indicated at 204. The reproduction 202 is accomplished using a 50% resolution cell threshold criteria, that is, resolution cells which contain 50% or more of the ellipse structure are shown darkened while cells containing less than 50% remain light.

Several observations regarding a matrix display are possible from the FIG. 2B reproduction, as follows:

Smaller resolution cells provide the best representation of the original image.

The display of curved images with a rectangular element matrix array will always result in image distortion, the degree of distortion depending on matrix resolution and degree of image curvature.

Resolution cell shapes other than a square could allow improved reproduction of some images.

Unused resolution cells (i.e., light appearing cells) are preferably reproduced with the smallest possible grid lines.

A display of the ellipse 200 using wider grid lines having the same center-to-center spacing as in FIG. 2B, is shown at 214 in FIG. 2C. The wider grid lines 215 in FIG. 2C result in a smaller active resolution cell 217 in FIG. 2C. The smaller resolution cells and heavier grid lines also result in a smaller active area ratio in FIG. 2C and inherently degrade the appearance of unused resolution cells such as the cell 218. It should also be noticed that in FIG. 2C the 50% fill criteria results in two additional resolution cells 221 and 227 being darkened in comparison with the FIG. 2B ellipse display and that this darkening provides an additional distortion of the desired image in the form of an artificially thickened end curvature. The appearance of image distortions such as this and the capability for evaluating the effect of such distortions on the information to be conveyed is, of course, one of the benefits realized in performing image simulations with the present invention.

A display of the ellipse 200 in the form shown at 214 in FIG. 2C is clearly less desirable than is the form shown in FIG. 2B, however, the form in FIG. 2C is more easily attained in a practical display since the heavier grid lines 215 provide more usable space for arranging the electrical conductors which couple each resolution cell element to its associated electronic driving circuitry.

Figure 2D:
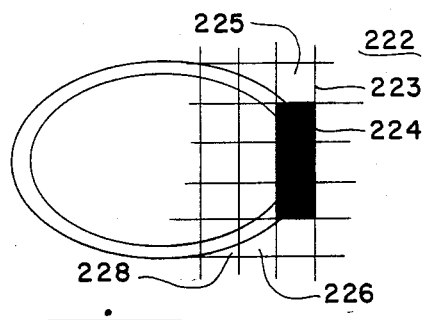

The effect of larger resolution cells in displaying the ellipse 200 is shown at 222 in FIG. 2D where each resolution cell 225 includes four times the area of the resolution cells in FIG. 2B, the grid lines 223 being of the same thickness as the grid lines 203 in FIG. 2B. The degree of image distortion observed in the FIG. 2D display is significant and unacceptable for most uses since the three vertically aligned resolution cells 224 represent the only cells which meet the 50% fill criteria for the ellipse 200 in the FIG. 2D display. The three similarly located resolution cells at the opposite ends of the ellipse would of course also be filled in FIG. 2D as was also the case in FIGS. 2B and 2C, however, none of the intermediate resolution cells in FIG. 2D contain a sufficient portion of the ellipse to be darkened.

The limited portrayal of the ellipse in FIG. 2D of course, results from the relative sizes of the ellipse elements and the resolution cells 225, as well as from the previously noted difficulty of representing curving images with rectangular resolution cells. Clearly the four plus four vertically aligned resolution cells of the FIG. 2D image are insufficient for display of the ellipse 200, since the essential four recognition cells 226 and 228 are omitted from the reproduced image.

The images of FIGS. 2A, 2B, 2C and 2D illustrate the type of tradeoff decisions which may be considered using the present invention. Without question the smaller resolution cells and fine grid lines are most desirable from an image quality viewpoint, however, in a practical system, the cost-considered question becomes one of how much resolution is essential. A consideration of additional factors is also essential in making this display decision, especially where such conditions as observer fatigue, large G forces, high ambient light level, noise modulation of the displayed image generating signal and observer occupation with other essential duties, such as piloting the aircraft are present. The display resolution elected for a particular system needs also to consider the size of the object being displayed which, for example, in airborne radar or infrared image system might depend not only on the size of the object on the ground, but also on the altitude and orientation of the observing aircraft. Electronic processing of the image information can, of course, be used to increase or decrease the size of the image with respect to the display capability, especially in the present simulation apparatus. Image size, when considered with respect to a viewer located at a fixed viewer separation distance, e.g., the distance 126 in FIG. 1, determines the image viewing angle—the angle subtended at the viewer's eye, 118 in FIG. 1, such as the angle 120. Viewing angle can also, of course, be determined by change of the display to viewer separation distance, as is indicated by the angle 124 and the alternative eye position 122 in FIG. 1.

Although the simple ellipse image of FIG. 2 illustrates the type of display contemplated in the present invention and the tradeoff factors which can be considered using the invention, an improved understanding of these considerations is possible from use of the preferred embodiment apparatus with actual military target information. Information of this type is shown in FIGS. 3-7 of the drawings using a variety of image reproduction criteria.

Figure 3:
FIG. 3 shows a high-resolution raster scan view of a military target scene.

In FIG. 3, there is shown a high-resolution display of a military target area wherein several segments of a bridge which crosses a body of water have been removed by military action. Additional features of the FIG. 3 image include structures or similar objects located both at the lower left and upper right shorelines adjacent the ends of the bridge structure. At the right center of the FIG. 3 image, there is shown a sand bar or ship tending facility protruding from the upper shoreline into the body of water. The FIG. 3 image also includes variations of the water shading such as might result from differences in water depth, the pollution content of the water, or possibly from clouds of natural or smoke source origin intervening between the image sensor and the ground scene. The FIG. 3 image was actually photographed on the image display of the I$^2$S processor wherein resolutions of 512 pixels of information are possible along the horizontal and vertical image axes.

Figure 4:
FIG. 4 shows the FIG. 3 scene displayed according to a first set of matrix display parameters.

A simulation of the FIG. 3 image using a matrix display of sixty-four by sixty-four resolution cell elements and having an active area ratio of 0.75 is shown in FIG. 4 of the drawings. The FIG. 4 simulation employs uniform darkening over the entire face of a resolution cell element in accordance with the capability of most matrix display elements. The FIG. 4 image is of relatively high quality for a matrix display, but is nevertheless incapable of displaying such fine details of the FIG. 3 image as the structures and the sand bar or ship tending facility that connects with the upper shoreline. The damaged bridge structure is identifiable only as to gross details in FIG. 4, as are the roadway and other details along the lower shoreline.

Figure 5:
FIG. 5 shows the FIG. 3 scene displayed according to a second set of matrix display parameters.
Figure 6:
FIG. 6 shows the FIG. 3 scene displayed according to a third set of matrix display parameters.
Figure 7:
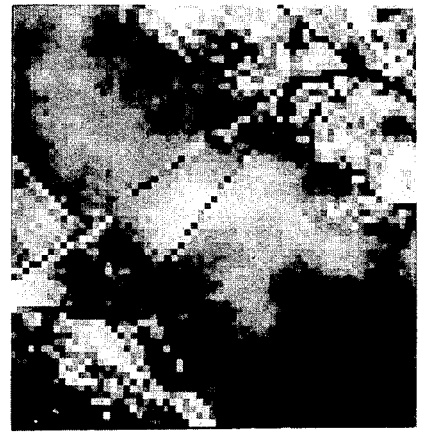
FIG. 7 shows the FIG. 3 scene displayed according to a fourth set of matrix display parameters.

FIG. 5 shows the FIG. 3 bridge scene using a matrix display of decreased 50% active area wherein the grid lines are considerably wider than in FIG. 4. FIG. 6 shows the identical image to FIG. 4, that is a 64×64, 75% active area image except that pseudo-random noise is imposed on the density of each resolution cell as is explained below. FIG. 7 shows a repetition of the FIG. 3 image using the same 64×64 resolution cell elements as FIGS. 4-6 but employing grid lines of zero width.

The best of the FIGS. 4-7 displays, i.e., FIG. 4 and FIG. 7, appear marginally adequate for resolving the grossest of the FIG. 3 details, that is, the water, bridge, clouds and road, but are of little value for conveying information regarding the sand bar, storage tanks, and other fine details of the FIG. 3 image. Depending upon the use to be made of the reproduced image, however, the FIGS. 4-7 reproductions may be sufficient; a pilot controlled missile guidance system for example, could probably be arranged to operate with images of the quality shown in FIG. 4 or FIG. 7. The effects of heavier grid lines in FIG. 5 and random noise as shown in FIG. 6 are especially notable in the degradation of image detail. Through the use of a matrix display simulating system as described herein, quick and convenient comparisons between the display variations represented in FIGS. 4-7 are possible for a large variety of displayed images.

Each of the FIGS. 3-7 images is of course generated using digital information which is stored in the form of an array of numbers. Each element of this array represents one resolution cell or one pixel of information in the reproduced image and each pixel is defined by some possible number of gray levels such as the $2^8$ or 256 gray levels provided for in the image array systems apparatus of the preferred embodiment.

COMPUTER PROGRAM

As indicated above, the determination of an appropriate gray level for each resolution cell display element, the superimposing of grid lines of an appropriate thickness and the incorporation of pseudo-random noise in the simulated matrix display is preferably accomplished through the use of computer software in combination with a general purpose computer such as the Digital Equipment Corporation PDP-11 computer identified above. Although use of a general purpose computer and dedicated software is a convenient and flexible arrangement for providing the necessary signal processing, it is also possible to employ dedicated hardware circuitry for accomplishing this signal processing. If desired, such a dedicated hardware embodiment may be arranged to perform parallel signal processing on a real time processing of image information basis so that the delay or off-line processing experienced with serial processing and serial software is avoided.

A number of computer languages are feasible for performing the image processing operations required in the invention. In the software described below, the commonly used FORTRAN scientific language is employed; a version of FORTRAN at any convenient level is suitable for use in the invention and modern advanced versions of FORTRAN such as FORTRAN 77 are not expressly required.

The software for processing pixel signals received from the digitizer 102 in FIG. 1 is indicated at 116 in FIG. 1 and is organized into the form of four subroutines or four verbs as such subroutines are referred to in the computer art. These four subroutines are called by an operating system in response to instructions received from a keyboard or other input devices. Since the operating system serves only to call the subroutines and the subroutines are the situs of the active conversion of original scene pixels into matrix array signals the present description is centered on the subroutines.

The four subroutines used in the preferred embodiment matrix display signal processing are identified by the three-letter designators SCA, GRI, ENL and NOI. These subroutines respectively achieve the fitting of received pixel element density values into an operator determined range of density values, provide the grid lines located intermediate the resolution cell elements in the simulated matrix display, enlarge or reduce the size of an input image, and modulate the matrix display image with pseudo-random noise. These subroutine names are for convenience derived from the words scale, grid, enlarge, and noise.

The subroutine listings shown below are annotated with comments identifying the function being performed in the next upcoming code lines; these comments are identified by the letter "C" in the first columns of the subroutine listing. The numbers occurring in the same lines of the listings denote jump addresses for use by program command statements such as "GO TO 10" or "GO TO 50" which appear in the later described subroutines herein.

The preceding word description of the signal processing to be performed herein in combination with the program comments, and the commonly used FORTRAN program language (i.e., understandable program code) are believed to be alone sufficient disclosure of the present invention for persons skilled in the computer image processing art or the computer programming art. A few additional comments which may assist a rapid comprehension of the program steps are nevertheless included in the present topic for additional clarification.

The program listings included herein do not contain computer printed line numbers for each line in the listings; for discussion purposes these numbers may be added manually commencing with line 1 for the subroutine identification line, assigning a number to every line containing any printed character (even a naked "C" character), and continuing through line 60 at the last page 1 line and line 84 at the end of the SCA listing, for example.

Essentially, the subroutine SCA examines the range of pixel density values occurring in the input image and then establishes a look-up table from which the output density value provoked by each input density value is determined. In the preferred embodiment this input to output relationship is established for each of the 262,144 (512×512) pixels in the input image and the new density value range is determined by operator input value received at line 18 of the SCA listing. In this line 18 code RAN and IRA are variables defining the low end and high end density values respectively, and 3R code indicates a radix 3 for these range values and indicates the programer's selected method for passing data into the subroutine.

The code at lines 12 and 13 of the SCA listing serve to pass variable value information from the operating system to the SCA subroutine, the variables "FROM" and "TO" relating to the input image and output image respectively. Similarly, the variables X Min and Y Min at lines 22 and 24 relate to input and output image density values, respectively. These variables are assigned initial values of 255 and 0, respectively at lines 24 and 25.

The variable "Pixels" at line 26 and the code at lines 26-31, lines 36-37 and lines 41-42 are for computing the mean and standard deviation statistics concerning the input image density values when desired, and are not essential to the describe invention. The SEMROW1 statement at line 34 reads in the intensity data for 1 horizontal row, 512 pixels, of the input image as is suggested by the comment at line 6 of the SCA listing.

The determination of a factor "scale" for changing the input image density values to the new density values occurs at lines 49 and 50 of the SCA listing, "X" again being input image density values and "Y" being output image density values. The factor "scale" is used to construct the conversion look-up table described above at lines 52-55 of the SCA listing, line 55 being also identified as line 30 in computer code. The constructed table which is named "Gray" would contain 256 values except for the "DO 30" statement at line 54, which initiates table construction at Y Min and which terminates table construction at the value Y Max.

The actual conversion of input image density values to output image density values using the table "Gray" commences at line 57 and continues through line 64. The conversion involves using each density array value BB1(J) as a pointer for locating a new density value in the look-up table "Gray" and placing the new value back in the "BB1(J) array" which is accomplished at line 62. The line 65 code causes the new density values to be placed back on the disc and the remainder of the SCA code at lines 66-84 is concerned with housekeeping functions such as computing statistical characteristic values and writing computed values on the display screen.

The subroutine GRI is organized in similar fashion to the SCA subroutine and may be line identified manually with numbers between 1 and 58 for descriptive purposes. As indicated above, the function of this subroutine is to generate the grid lines that appear between resolution cell elements in a matrix display using the line width, spacing and density value requested by an operator.

The image density to be used for the grid lines is assigned at line 24 of the GRI listing, density being represented by the variable "value". The reading of scene pixel density or intensity values is accomplished by the "SEMROW" routine at line 31 and the use of the variable "value" to replace the image density input numbers (for entire columns comprising successive vertical grid lines) is accomplished at line 43. The writing of the new vertical grid line values to the computer disc is accomplished at line 46.

The changing of image density values to the selected grid density value for horizontal rows or horizontal grid lines is accomplished at line 52 of the GRI subroutine while the writing of horizontal grid line data to the computer disc occurs at line 55.

The subroutine "ENL" has the capability for increasing (enlarging) or reducing the size of an input image into the size elected by an operator for reproduction of the simulated matrix display. This selection of how much input image area is to be spread over a predetermined number of output display elements is of course, determinative of the resolution of the simulated matrix display.

In the subroutine "ENL" the statements commencing at line 10 and involving the word "common" pass variable values between a calling routine and the "ENL" subroutine as was indicated previously for the SCA subroutine; these variables represent information that is accessible to the "ENL" and other subroutines. The statements preceding the common statements perform the setting up of variables of several types and number.

The actual reduction or increase of image size is performed pixel by pixel, commencing at line 50 of the "ENL" subroutine—after establishing whether an enlargement or reduction is to be accomplished and by what factor, "NBLO", between lines 19 and 41. The density values for the input image are read in from the computer disc at line 48 by the "SEMROW 1" command and assigned to an array "BBIN". Image density values for the output array "BBOUT" are assigned at line 52, a number of output array values being made equal to each input array value at this line for an image enlargement operation.

This size changed output data is transferred to the computer disc at line 55 using the "SEMROW 2" instruction. The remainder of the "ENL" subroutine through line 67 is concerned with housekeeping functions such as message printing and statistical computing.

The random noise generating subroutine NOI provides the capability for simulating the effect of noise on a matrix display; generally this subroutine operates on the concept of a look-up exchange wherein an input value or seed is used to access the output value that is displayed in lieu of the input number on the matrix display. The noise generating algorithm is arranged such that repetition of a particular input value provides a duplicate output value for each occurrence.

For descriptive purposes the NOI subroutine may be line identified with numbers between 1 and 91, again assuming each line containing at least a single character also receives an identifying number and commencing the numbering at the line "subroutine to generate noise".

The random noise subroutine employs a set of random number values obtained from either software or hardware and having values between 0 and 1 before scaling to add to each pixel value in an image to be processed. The subroutine shown herein has provision for either multiplication or addition use of the random number, however, addition of the noise is preferred for use in the invention.

If the REAL option is specified in using the random noise subroutine, only the real parts of the image will be affected by noise and the imaginary parts (if any) will remain the same. By default, the subroutine multiplies the real and imaginary parts of each point by random numbers in the range of values between ($-$RANGE to $+$RANGE) selected by the analyst. If ADDITIVE NOISE is specified in lieu of the default, random numbers in the range of values between ($-$RANGE to $+$RANGE) are ADDED instead to the value of each point.

If the variable RNM is set to a particular real value, the same NOISE can be applied repeatedly by the subroutine, otherwise, the NOISE applied will be different each application during the same session. The current value of RNM is stored as a global variable after the first use of the noise subroutine. The random NOISE is determined as in the manner indicated below from the supplied data or, if not specified by the analyst, from the last value of the global data:

$$ARNM = RNM*5.67152419 + 0.134615743$$

$$RNM = ARNM - INT(ARNM)$$

where the 5.67152419 and 0.134615743 values represent scaling parameters required by the random number generation algorithm to produce statistically random numbers.

If multiplicative noise is elected, then $$\text{new value} = \text{old value}*(1. + (RNM - 0.5)*2*2 \text{ RAN})$$

If additive noise is elected, then $$\text{new value} = \text{old value} + (RNM - 0.5)*2*RAN$$

As will be apparent to persons skilled in the programming art from the above description and the Noise subroutine listing, the variable RNM is used as a seed. The first call to the noise subroutine results in use of the seed as a random number value with this value subsequently being replaced by a new value. If desired, the subroutine allows repetition of the same noise values at subsequent analysis sessions.

While the apparatus and method herein described constitute a preferred embodiment of the invention, it is to be understood that the invention is not limited to this precise form of apparatus or method, and that changes may be made therein without departing from the scope of the invention, which is defined in the appended claims.

```
C     SUBROUTINE TO GENERATE NOISE
C
C APPLIES WHITE MULTIPLICATIVE OR ADDITIVE ('ADD') NOISE.
C MULTPLICANDS ARE UNIFORM IN 1+/- 'RANGE'. ADDENDS IN +/- 'RANGE'
C
C
C XREFS:   SEMLU, SEMROW, VAL
C
      SUBROUTINE NOISE
      BYTE BB(1024)
      INTEGER SCALEH,RANDH,ADDH,REALH,CLASS,VERB
      LOGICAL ADD,INTRNL,LDUM,SEMLU,SEMROW
      REAL INPUT,LASTIN,MIN,MAX,MEAN,IMIN,IMAX,IMEAN,ISD
      COMMON /SEMBUF/ B(512)
      COMMON /SEMTAB/ ERROR,INPUT,PLOT,LASTIN,SELECT,FROM,TO,MIN
     1       ,MAX,MEAN,SD,IMIN,IMAX,IMEAN,ISD,VALRST(35),KREST(50)
      COMMON /SEMUNI/ ICNS1,ICNS2,LOG,IGRPH,IREP
      COMMON /SEMLVS/ LPRIOR,LVS(5,8),LV1,LV2,LV3,LROW,NROW,CLASS
     1       ,JSTAT,VERB,IDIS,IOFF,JOFF,SAM
      EQUIVALENCE (B,BB)
      DATA MASK/"377/
C
C ****** CHANGE ******
C PACKED NAMES:
C RANGE RNM ADD REAL
      DATA SCALEH/3RRAN/,RANDH/3RRNM/,ADDH/3RADD/,REALH/3RREA/
C ****** ****** ******
C
C INITIALISE
      INC = 1
      INTRNL = .TRUE.
      IF (CLASS .EQ. 0) INTRNL = .FALSE.
      IF (INTRNL) INC = 2
      M2 = LROW*INC
      SCALE=2*VAL(SCALEH)
      ADD=SEMLU(-1,ADDH,X)
      KREAL=1
      IF (SEMLU(-1,REALH,X)) KREAL=2
      Y = VAL(RANDH)
C
C PASS THROUGH DATA
      DO 18 J=1,NROW
          IF (SEMROW(1,B,J,LV1)) RETURN
          Y = Y*5.67152419+.134615743
          M = Y
          Y = Y-M
C
C GENERATE NOISE AS FRPT(X*9.378651)
          X=Y
          IF (.NOT.INTRNL) GOTO 6
          DO 3 I=1,M2,KREAL
             X=X*9.378651
             M=X
             X=X-M
             IF (ADD) GOTO 1
             B(I)=B(I)*(1.+(X-.5)*SCALE)
             GOTO 3
             B(I)=B(I)+(X-.5)*SCALE
             CONTINUE
          GOTO 15
          DO 12 I = 1,M2,INC
             X=X*9.378651
```

```
              M=X
              X=X-M
              RB = BB(I) .AND. MASK
              IF (ADD) GOTO 9
              IB = RB*(1.+(X-.5)*SCALE)+.5
              IF (IB.LT.0) IB = 0
              IF (IB.GT.255) IB = 255
              BB(I) = IB
              GOTO 12
9             IB = RB+(X-.5)*SCALE+.5
              IF (IB.LT.0) IB = 0
              IF (IB.GT.255) IB = 255
              BB(I) = IB
12            CONTINUE
15         IF (SEMROW(2,B,J,LV2)) RETURN
18         CONTINUE
C
C STORE CURRENT RANDOM NUMBER
           LDUM=SEMLU(1,RANDH,Y)
C
C UPDATE LOG
           M=FROM
           SCALE=SCALE/2.
           WRITE (LOG,100) M,M2,SCALE
           IF (ADD) WRITE (LOG,103)
           RETURN
100        FORMAT (' NOISE',I7,I4,' RANGE',G12.4)
103        FORMAT ('+',30X,'(ADD)')
           END

SUBROUTINE ENL(CA)
C
C   THIS IS A DUAL PURPOSE VERB TO ENLARGE OR REDUCE THE SIZE OF AN
C   IMAGE
C
           BYTE BBIN(2048),BBOUT(1024)
           REAL INPUT,LASTIN,MIN,MAX,MEAN,IMIN,IMAX,IMEAN,ISD
           INTEGER CLASS,VERB,TIMH,SAMH,REDUCE,ROWS,COLS
           LOGICAL SEMLU,SEMROW
           REAL CA(2,512)
           COMMON /SEMBUF/ CB(2,512)
           COMMON /SEMLVS/ LPRIOR,LVS(5,8),LV1,LV2,LV3,COLS,ROWS,CLASS,
          1       JSTAT,VERB,IDIS
           COMMON /SEMTAB/ ERROR,INPUT,PLOT,LASTIN,SELECT,FROM,TO,MIN,
          1       MAX,MEAN,SD,IMIN,IMAX,IMEAN,ISD,VALRST(35),KREST(50)
           COMMON/SEMUNI/IUN1,IUN2,LOG,IETC
           EQUIVALENCE(BBIN,CB),(BBOUT,BBIN(1025))
           DATA TIMH/3RTIM/,REDUCE/3RRED/
C
           II=0
           ITO=TO
           IFROM=FROM
C
C    IF VERB IS REDUCE THE KEY IS SAMPLE
           IF((VERB.NE.REDUCE).AND..NOT.SEMLU(-1,TIMH,TIMES))GO TO 991
C
C    IF VERB IS ENLARGE THE KEY IS TIMES
           NBLO=TIMES
           IY=NBLO*ROWS
           IX=NBLO*COLS
           NSAMP=1
C
```

```
C    IS THIS A REDUCTION OR AN ENLARGEMENT ?
C
           IF(VERB.NE.REDUCE)GO TO 10
C
C    THIS MUST BE A REDUCTION....
C
           NSAMP=SAMP
           IX=COLS/NSAMP
           IY=ROWS/NSAMP
           NBLO=1
C
C
C      THIS SECTION PERFORMS THE ACTUAL REDUCTION OR ENLARGEMENT...
C
10         CONTINUE
           DO 40 I=1,ROWS,NSAMP
              IF(SEMROW(1,BBIN,I,LV1)) RETURN
              KK=0
              DO 30 K=1,COLS,NSAMP
                 DO 20 L=1,NBLO
20                  BBOUT(KK+L)=BBIN(K)
                 KK=KK+NBLO
              II=II+NBLO
40            IF(SEMROW(2,BBOUT,II,LV2)) RETURN
C
C    PRINT A MESSAGE INDICATING OPERATION SUCCESSFUL...
C
           IF(VERB.NE.REDUCE)WRITE(LOG,1000)IFROM,NBLO,LTO
           IF(VERB.EQ.REDUCE)WRITE(LOG,1010)IFROM,NSAMP,LTO
C
C    FORMAT STATEMENTS...
C
1000       FORMAT(' ENLARGE ',I3,I4,' TIMES > ',I3)
1010       FORMAT(' REDUCE ',I3,' SAMP= 'I3' > ',I3)
           RETURN
           END

SUBROUTINE GRI
C
C    SEMROW' - ROUTINE TO READ/WRITE ONE ROW OF IMAGE DATA FROM/TO
C              DISK
C       VAL' - REAL FUNCTION TO RETURN REAL VALUE OF PASSED PARAMETER
C      'IVAL' - INTEGER FUNCTION TO RETURN REAL VALUE OF PASSED
C              PARAMETER
C
C    PASSED VARIABLES FROM THE CALLING PROGRAM
C              NUM - NUMBER OF POINTS BETWEEN GRID LINES
C              INT - INTENSITY OF GRID LINES (GRAY LEVEL)
C              WID - WIDTH OF GRID LINES
C              LV1 - INPUT IMAGE LOCATION
C              LV2 - OUTPUT IMAGE LOCATION
C
       BYTE BB1(1024)
       INTEGER ROW,COLUMN
       LOGICAL SEMROW
       EQUIVALENCE (B1,BB1)
C
C    NUMBER   INTENSITY WIDTH LV1 LV2
       DATA NUMH/3RNUM/,INTH/3RINT/,WIDH/3RWID/,LV1H/3RLV1/,LV2H/3RLV2/
C
           IWIDTH = IVAL(WIDH)
           NUM = VAL(NUMH)
```

```
              VALUE = VAL(INTH)
              LV1=IVAL(LV1H)
              LV2=IVAL(LV2H)
              IF (VALUE.LT.0.OR.VALUE.GT.255) RETURN
              ROW = 1
              COLUMN= 1
10            IF (ROW.GT.512) RETURN
              IF (SEMROW(1,B1,ROW,LV1)) RETURN
              IF (COLUMN.GT.NUM) GOTO 50
              K1 = 1
              K = 1
20            IF (K.GT.NUM) GOTO 30
              K = K + 1
              K1 = K1 + 1
              IF (K1.GT.512) GOTO 40
              GOTO 20
30            K = 1
              DO 35  I = 1,IWIDTH
                  IF (K1.GT.512) GOTO 35
                  BB1(K1) = VALUE
35                K1 = K1 + 1
              IF (K1.LT.LROW) GOTO 20
40            IF (SEMROW(2,B1,ROW,LV2)) RETURN
              ROW = ROW + 1
              COLUMN = COLUMN + 1
              GOTO 10
50            COLUMN= 1
              DO 55  I = 1,512
55              BB1(I) = VALUE
              DO 60  I = 1,IWIDTH
                  IF (ROW.GT.512) GOTO 60
                  IF (SEMROW(2,B1,ROW,LV2)) RETURN
60                ROW = ROW + 1
              GOTO 10
              END

SUBROUTINE SCA
C                                                   ,
C     'VAL' IS A REAL FUNCTION THAT RETURNS THE REAL VALUE OF THE
C             PARAMETER IN ().
C
C     'SEMROW' IS A ROUTINE THAT READS/WRITES ONE ROW OF DATA FROM
C             THE DISK DRIVES.
C
C
      BYTE BB1(1024)
      INTEGER GRAY(0:255),GTH
      LOGICAL SEMROW,SEMLU
      COMMON/SEMTAB/FROM,TO
      COMMON /SEMLVS/LV1,LV2,LV3,COLMNS,ROWS
C
      EQUIVALENCE (B1,BB1)
C
C  RANGE IRANGE
      DATA LTH/3RRAN/,GTH/3RIRA/
C
      IFROM = FROM
      ITO = TO
      XMIN = VAL(LTH)
      XMAX = VAL(GTH)
      YMIN=255.
      YMAX=0.
```

```
              PIXELS = FLOAT(ROWS)*FLOAT(COLMNS)
              SUMX = 0.0
              SUMX2 = 0.0
C
C    DETERMINE THE INPUT STATISTICS OF THE IMAGE
C         YMIN=MINIMUM   YMAX=MAXIMUM   YMEAN=MEAN   YSD=STANDARD
C                                                       DEVIATION
C
              DO 20  I=1,ROWS
                 IF(SEMROW(1,B1,I,LV1))RETURN
                 DO 10  J=1,COLMNS
                    SUMX = SUMX + BB1(J)
                    SUMX2 = SUMX2 + (BB1(J)**2.0)
                    IF(YMIN.GT.BB1(J))YMIN=BB1(J)
10                  IF(YMAX.LT.BB1(J))YMAX=BB1(J)
20            CONTINUE
              YMEAN = SUMX/PIXELS
              YSD = ((SUMX2/PIXELS) - (YMEAN**2.0))**.5
C
              SUMX = 0.0
              SUMX2 = 0.0
C
C    DETERMINE THE NEW SCALE FACTOR TO USE
C
              IF ((YMAX-YMIN).EQ.0) SCALE = 0.
              IF((YMAX-YMIN).NE.0) SCALE=(XMAX+1.-XMIN)/(YMAX-YMIN)
C
C    ESTABLISH A CONVERSION LOOK UP TABLE
C
              DO 30  I=YMIN,YMAX
30               GRAY(I)=(I-YMIN)*SCALE + XMIN
C
C    CHANGE THE IMAGE VALUES TO THE NEW SCALE RANGE REQUESTED.
C
              DO 50  I=1,ROWS
                 IF(SEMROW(1,B1,I,LV1))RETURN
                 DO 40  J=1,COLMNS
                    BB1(J) = GRAY(BB1(J))
                    SUMX = SUMX + (GRAY(BB1(J))
40                  SUMX2 = SUMX2 + GRAY(BB1(J))**2.0
50            IF(SEMROW(2,B1,I,LV2))RETURN
C
C
          XMEAN = SUMX/PIXELS
          XSD = ((SUMX2/PIXELS) - (XMEAN**2,0))**.5
C
C    DISPLAY THE STATISTICS BEFORE AND AFTER THE SCALE OPERATION
C
          IF (SCALE.EQ.0)WRITE(5,1000)XMIN
          WRITE (5,1010)
          WRITE (5,1020)IFROM,YMIN,YMAX,YMEAN,YSD
          WRITE(5,1020)ITO,XMIN,MXAX,XMEAN,XSD
          RETURN
C
C   FORMAT DECLARATIONS
C
1000   FORMAT ('   ALL VALUES SET TO ',F5.1)
1010   FORMAT(21X,'MIN',7X,'MAX',7X,'MEAN',5X,'STD DEV')
1020   FORMAT(11X,'IMAGE:',I3,2X,4(F5.1,5X))
       END
```

I claim:

1. Matrix display simulation apparatus comprising the combination of:

means for coding an input image into a first array of digital signals of magnitudes representing image density at each input image pixel;

means for conforming the digital signal magnitudes representing predetermined numbers of adjacent pixels in said input image to a common value, a second array of said common value signals being capable of representing said input image in decreased resolution, larger pixel form;

means for scaling the range of density values in said common value signal second array into a third array of predetermined dynamic signal range;

fourth array random number means of predetermined numeric means and variance for amplitude modulating similar magnitude values in said predetermined dynamic range third array, thereby forming a pseudo noise modulated fifth array of pixel density values;

cathode ray tube display means for reconstructing said fifth array of pixel density values into an output image having controlled resolution, dynamic range and pseudo noise modulation;

grid writing means for obscuring from said display image a matrix element interstice simulating grid of periodically spaced orthogonal bands, said bands having controllable grid line spacing, width and pixel density.

2. The apparatus of claim 1 wherein said means for coding includes electronic scanning apparatus.

3. The apparatus of claim 1 wherein said means for equalizing includes a predetermined equalizing algorithm.

4. The apparatus of claim 1 further including means for controlling the viewing angle subtended by a display image pixel.

5. The apparatus of claim 4 wherein said viewing angle control means includes control of the display means to viewer separation distance.

6. The apparatus of claim 1 wherein said means for equalizing signal magnitudes includes:

means for reducing the physical size of said input image by a predetermined area factor while maintaining fixed pixel element sensing resolution and means for replicating each pixel in the reduced image a predetermined number of times.

7. The apparatus of claim 1 further including means for maintaining the image density of said output image at a constant value between said grid bands.

8. The apparatus of claim 1 wherein said orthogonal grid bands are oriented in the horizontal and vertical directions on said display means.

9. A method for simulating a matrix display on a cathode ray tube screen comprising the steps of:

coding an input image into a first array of digital signals having array element magnitudes representative of image density at each input image pixel;

conforming the array magnitude values representing predetermined numbers of adjacent pixels in said input image to a common value, forming thereby a second image array;

scaling the range of density values in said common value second array into a third array of predetermined dynamic signal range;

amplitude modulating similar magnitude values in said predetermined dynamic range third array with fourth array random modulation coefficients of predetermined numeric means and variance, the modulated third array values comprising a fifth array of values;

displaying said fifth array of values with a cathode ray tube display; and obscuring from said cathode ray tube image a matrix element interstice simulating grid of periodically spaced orthogonal bands of controllable spacing and width.

10. Matrix display simulation apparatus comprising:

a digital computer (100);

a cathode ray tube visual monitor controlled by said digital computer (108, 112);

means (102) for digitizing an input image pixel by pixel into a first array of numeric values, said digitizing including grey scale numeric values for each said input image pixel;

means (116) cooperative with said digital computer and selective of predetermined periodic of said input image array pixel values for generating a second, smaller array of numeric values representative of said input image with reduced physical size and reduced pixel count;

means (116) cooperative with said digital computer for generating and combining with said second smaller array numeric values a random noise signal;

means (116) cooperative with said digital computer for replicating each of said noise combined, reduced size and pixel count array values to form a third numeric value array larger than said second array and of said input image first array size and reduced image resolution;

means (116) cooperative with said digital computer for replacing each of said input image grey scale values with a grey scale value selected from a predetermined smaller range of grey scale values according to a predetermined selection relationship, thereby forming a fourth numeric value array; and means (116) for replacing selected periodic of said fourth array values with grid matrix interstice line grey scale values of predetermined line width and grey scale;

whereby said apparatus enables a conveniently alterable matrix display simulation of said input image with selectable display grid line, grey scale resolution, pixel size and noise content.

11. The apparatus of claim 10 wherein said means for generating and combining random noise includes means for selectively generating additive and multiplicative noise.

12. The apparatus of claim 10 wherein said means for generating a second, smaller array and said means for replicating comprise a common means having elective reduction and enlargement capability.

13. The apparatus of claim 10 wherein said means cooperative with said digital computer comprises computer software.

14. The apparatus of claim 13 wherein said computer software comprises a plurality of subroutines each capable of performing one of said means cooperative element functional steps.

* * * * *